United States Patent
Gardner et al.

(10) Patent No.: US 8,028,034 B2
(45) Date of Patent: *Sep. 27, 2011

(54) SYSTEM AND METHOD FOR AUTOMATICALLY LEARNING MAILBOX CONFIGURATION CONVENTIONS

(75) Inventors: Darren L. Gardner, Issaquah, WA (US); Shaibal Roy, Sammamish, WA (US)

(73) Assignee: Teamon Systems, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/550,575

(22) Filed: Aug. 31, 2009

(65) Prior Publication Data

US 2009/0319452 A1    Dec. 24, 2009

Related U.S. Application Data

(63) Continuation of application No. 10/778,468, filed on Feb. 13, 2004, now Pat. No. 7,603,419.

(60) Provisional application No. 60/494,256, filed on Aug. 11, 2003.

(51) Int. Cl.
G06F 15/16    (2006.01)

(52) U.S. Cl. ............... 709/206; 709/200; 379/4; 379/7; 379/8; 455/400

(58) Field of Classification Search ...... 709/2, 200–206, 709/250; 707/600–800; 379/4, 7, 8
See application file for complete search history.

(56) References Cited

U.S. PATENT DOCUMENTS

| | | | |
|---|---|---|---|
| 5,968,117 A | 10/1999 | Schuetze | 709/206 |
| 6,289,460 B1 * | 9/2001 | Hajmiragha | 726/28 |
| 6,446,114 B1 | 9/2002 | Bulfer et al. | 709/206 |
| 6,549,937 B1 | 4/2003 | Auerbach et al. | 709/206 |
| 6,594,706 B1 | 7/2003 | DeCoursey et al. | 709/238 |
| 6,615,276 B1 | 9/2003 | Mastrianni et al. | 709/250 |
| 6,654,787 B1 | 11/2003 | Aronson et al. | 709/206 |
| 6,728,759 B1 | 4/2004 | Na | 709/206 |
| 6,868,070 B1 | 3/2005 | Alves et al. | 370/255 |
| 7,020,687 B2 | 3/2006 | Mooney et al. | 709/206 |
| 7,032,014 B2 | 4/2006 | Thiyagarajan et al. | 709/220 |
| 7,171,379 B2 | 1/2007 | Menninger et al. | 705/28 |
| 7,209,551 B1 | 4/2007 | Schroeder et al. | 379/88.13 |
| 7,213,048 B1 | 5/2007 | Parupudi et al. | 709/203 |
| 7,222,228 B1 | 5/2007 | Stephens et al. | 713/1 |
| 7,584,251 B2 | 9/2009 | Brown et al. | 709/206 |
| 7,603,419 B2 * | 10/2009 | Gardner et al. | 709/206 |
| 2002/0112007 A1 | 8/2002 | Wood et al. | 709/206 |
| 2003/0041147 A1 | 2/2003 | van den Oord et al. | 709/227 |
| 2004/0181580 A1 * | 9/2004 | Baranshamaje | 709/206 |

FOREIGN PATENT DOCUMENTS

| | | |
|---|---|---|
| WO | 9832273 | 7/1998 |
| WO | 0022543 | 4/2000 |

* cited by examiner

*Primary Examiner* — Don Wong
*Assistant Examiner* — Tuan-Khanh Phan
(74) *Attorney, Agent, or Firm* — Allen, Dyer, Doppelt, Milbrath & Gilchrist, P.A.

(57) ABSTRACT

A system and method automatically learns mailbox configuration conventions. The validator module determines a valid set of configuration parameters used for accessing an electronic mailbox of a user within a mail domain after receiving configuration information from the user that is limited in the configuration parameters required for accessing the electronic mailbox. A learner module accepts from the validator module a set of configuration parameters determined to be valid and generates configuration conventions for a mail domain. A database store is the generated configuration conventions. The validator and learner modules can be operative as part of a web server.

31 Claims, 8 Drawing Sheets

SYSTEM AND METHOD FOR AUTOMATICALLY LEARNING MAILBOX CONFIGURATION CONVENTIONS

RELATED APPLICATION

This application is a continuation of Ser. No. 10/778,468 filed Feb. 13, 2004 now U.S. Pat. No. 7,603,419 which claims the benefit of U.S. provisional application Ser. No. 60/494,256 filed Aug. 11, 2003, both of which are hereby incorporated herein in their entireties by reference.

FIELD OF THE INVENTION

The present invention relates generally to electronic mail systems, and in particular, to automatically learning mailbox configuration conventions for mail domains.

BACKGROUND OF THE INVENTION

Electronic mail (email) has become a very important means of communication. Users of email may have one or more mailboxes that they may need to access from a variety of devices or systems and a variety of locations. Various services may also access the mailboxes. For example, some services provide a unified mailbox that allows the user to access one or more mailboxes through the unified mailbox.

Services such as Yahoo™ now provide mailbox services that automatically poll a predefined list of mailboxes to determine if new email has been received. New emails that have been received in any of the polled mailboxes are retrieved into the requesting mailbox. As a result, the user only has to check the requesting mailbox to determine if new email has arrived in any of the other mailboxes. This reduces the number of mailboxes that are required to be checked periodically. Other services allow a user to access their mailboxes through a plurality of devices such as, but not limited to, mobile phones, mobile computing devices, for example, personal digital assistants (POA's) and other communications devices.

In order to access a mailbox, a valid set of configuration parameters must be specified. An essential parameter is the mailbox protocol through which access to the mailbox is achieved, since there are many different mailbox protocols in existence, such as Post Office Protocol (POP) and Internet Message Access Protocol (IMAP). Other parameters might include a mailbox server name or a mailbox login name. Each unique combination of these parameters defines a different configuration that can be used to access the mailbox. In some cases, there are multiple unique configurations that can be used to specify access to a single mailbox, whereas in other cases, only one specific configuration can be used. Typically, the user would have to determine these configuration parameters for each of the mailboxes and configure manually a web service associated with a web server to access each of the mailboxes.

One proposal in U.S. patent application publication no. 2002/0174194 provides a single web-based interface that gives the user access to a plurality of different message accounts on different message servers. This proposal allows email clients to access only a subset, namely messaging, of an IMAP server, and requires a user to establish all configuration parameters for the IMAP server functionality. Other similar proposals that require a user to determine and manually configure a web service for configuration parameters are disclosed in U.S. Pat. No. 5,968,117 and U.S. published patent application no. 2002/0112007, where message sources are established during setup and a technical support can be called.

U.S. Pat. No. 6,446,114 discloses the use of an agent that searches a user database to determine a list of messaging systems the user subscribes. The agent recalls from an application database any procedures for accessing the messaging systems and logs onto each messaging system to retrieve new messages.

These various services that access the user's mailboxes require configuration parameters, such as a mail host and a protocol, to access the mailbox. The vast majority of users only know their email address and password, and do not know the values of the remaining configuration parameters. If all the configuration parameters had to be specified by the user, and the user was unable to provide the configuration parameters, the web service would not be able to access the user's mailboxes and the user would be denied the service. As a result, it is important that the configuration parameters for the user's mailboxes be determined based on the limited information that the user is able to provide to the email provider or other service.

SUMMARY OF THE INVENTION

It is therefore an object of the present invention to provide a system and method that automatically learns conventions used by mail domains to aid in determining configuration parameters and allow users to access electronic mailboxes based on limited information that a user is able to provide.

In accordance with the present invention, a system automatically learns mailbox configuration conventions and includes a validator module that determines a valid set of configuration parameters used for accessing an electronic mailbox of a user within a mail domain after receiving configuration information from the user that is limited in the configuration parameters required for accessing the electronic mailbox. A learner module accepts from the validator module a set of configuration parameters determined to be valid and generates configuration conventions for a mail domain. A database stores the generated configuration conventions.

In yet another aspect of the present invention, the validator module and learner module are operative as a mailbox interface module and acts as an agent between an email client of the user and a respective electronic mailbox. The validator module and learner module can be operative on a web server, as well as the database that stores the generated configuration conventions.

The learner module is operative for applying tests to the configuration parameters to ensure that the configuration parameters are credible. The learner module can also be operative for applying rules from a rules database for indicating which configuration conventions are to be learned.

In yet another aspect of the present invention, the configuration conventions stored within the database can be standard configuration conventions applicable to all mail domains. The configuration information can also be received from a user as an email address and a password. A configuration information can also be formed as an access protocol for the respective electronic mailbox being accessed, such as the Post Office Protocol (POP) or an Internet Message Access Protocol (IMAP).

A method and computer-readable medium, in accordance with the present invention, is disclosed and set forth.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
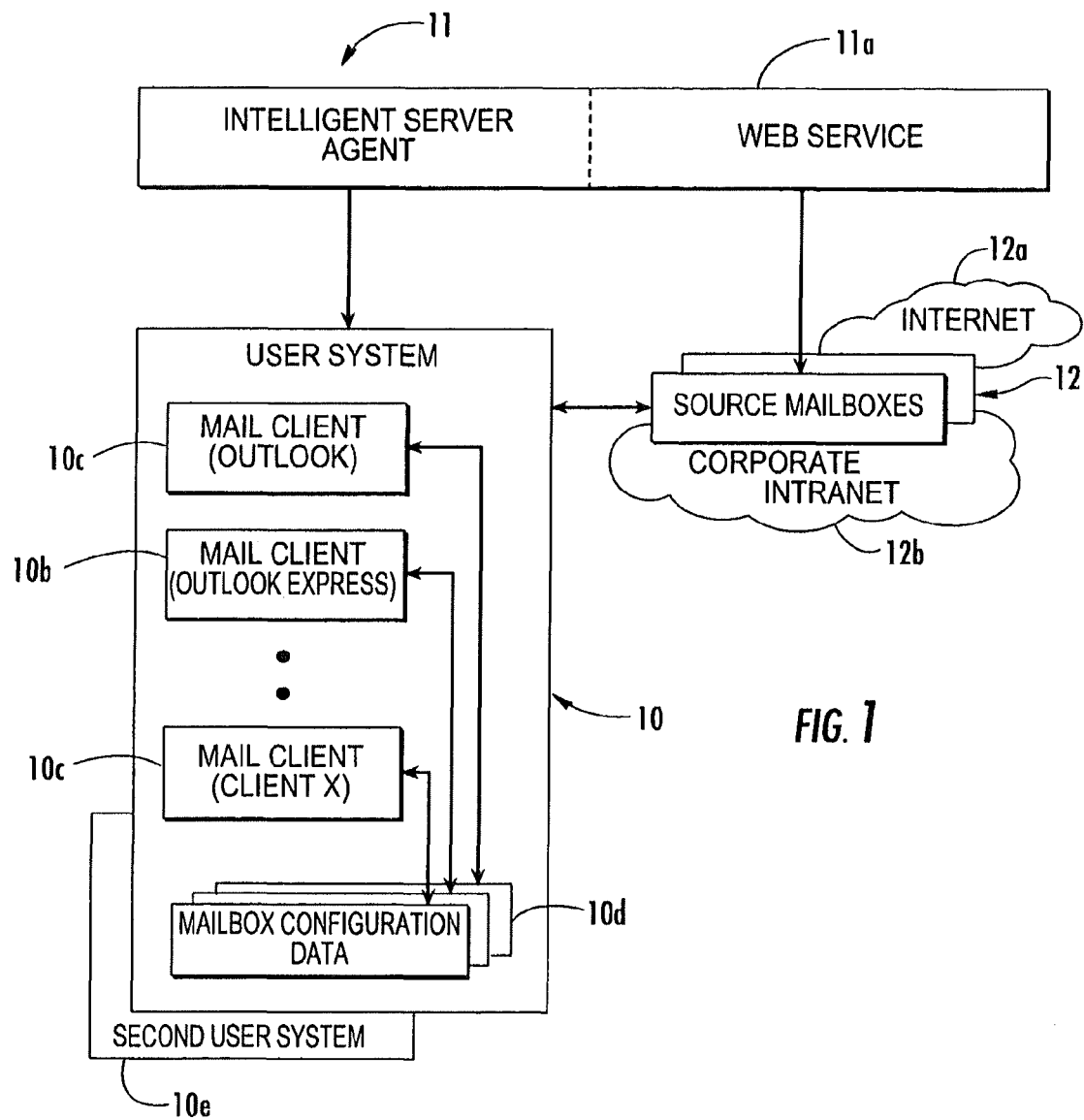
FIG. 1 is a high level block diagram of a system that includes an intelligent server having a mailbox interface module operative with a user system and source mailbox, and can include various functions, including the learning of configuration conventions, configuring access to mailboxes and guessing configuration parameters, and transforming configuration conventions into configurations using context data, according to one aspect of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

The present invention advantageously overcomes the disadvantages of the prior art that was limited to enabling access to various email accounts by configuring a desktop PC or mobile unit, such as a pocket PC, and establishing all the various settings, including the various configuration conventions and parameters, such as the ports, settings, including proxy settings, connections, email and other essential information for a POP or similar server using SMTP or other protocol.

The present invention advantageously allows a user to enter only a minimal set of data, such as an email address and password, and the system and method of the present invention determines through a pattern of learning and use of knowledge base what it is that one uses to access accounts and the server connections. The present invention can draw upon a database as a knowledge base and use symbolic expressions with levels of certainty to "guess" or determine mailbox configurations.

The present invention also allows users that have limited knowledge regarding their email account as to define their account for purposes of establishing server connections and being able to draw into one location, such as a mobile phone or personal computer, having only one email client or other means, a number of different email addresses and manage multiple mailboxes. This is advantageous because it is well known that many people have many different mailboxes that could be implemented in a variety of mailbox protocols, such as a post office protocol (POP) and different email clients and different companies.

The present invention has several different aspects. By using a database as a rule store and an electronic mailbox interface module as a module for learning, it is possible to automatically learn mailbox configuration conventions used by mail domains. In another aspect of the present invention, sets of potentially valid mailbox configurations can be determined by the interface module and symbolic expressions used to represent configuration parameters.

It is well known that in order for a user to access the mailbox provided to them by their email provider, they must provide the correct set of configuration parameters. These parameters vary, but include such parameters as a mail host, port, login name, password, and other parameters for use of their mailbox. Email providers are free to use any convention they choose for these parameters. For example, many email providers employ the use of a "defacto standard" convention for these parameters, such as using a mail host name of "mail.<MailDomain>", where <MailDomain> represents the provider's e-mail domain (i.e., "foo.com"). Another example could be an address, such as JohnSmith@earthlink.net. The user may only know their email address and a password, for example, "password." Information not known to the normal user could be a port number; the POP3 server: pop.earthlink.net; the SMTP server: smtpauth.earthlink.net; the domain of earthlink.net; a different user name as indicated above, the FTP server: ftp-www.earthlink.net; an access ID; and DNS address: for example, 207.69.188.XXX.

There are, however, are also many mail providers that do not adhere to such conventions, and these mail providers use far less obvious conventions for these configuration parameters. This makes the task of determining the configuration for a user's mailbox in such a mail domain much more difficult, if not impossible. For example, if the users email address is "john.smith@foo.com", the email provider may use a less obvious convention, for example, if the login name is "jsmi". As a result, it is important to capture the less obvious conventions that are specific to an email provider or mail domain.

FIG. 1 shows a high level block diagram of a user system 10 that is operative with an intelligent server 11 in one aspect of the present invention, which operates as an agent and mailbox interface module and communicates with source mailboxes 12. The user system 10 includes various email clients 10*a*, 10*b* and 10*c*, which in this example, correspond to an Outlook mail client, an Outlook Express mail client, and a proprietary mail client for Client X, each associated with respective source mailboxes 12. The user system 10 also includes mailbox configuration data 10*d* for each of the email clients 10*a*, 10*b* and 10*c*. It should be understood that the various email clients could be located on different user systems, as illustrated by the second user system 10*e*. The user system 10 is operative with the intelligent server 11 acting as an agent. The user system could be a wireless, mobile device, such as a hand-held Blackberry unit. The source mailboxes could be located on the internet 12*a*, a corporate intranet 12*b*, or both.

The intelligent server 11 as an agent performs various functions and can include various functional modules, and a database as a conventions data store and validator modules as will be explained below. It should also be understood that some of the functions of the intelligent server as an agent could also be downloaded to the user system and operative by the user as when inputting information into a mobile device or home computer.

It should be understood that the software and programming used for the present invention can vary, and different applications can be used. The intelligent server 11 can use web services technology (shown by the area indicated as web services 11a) and include different application services used by those skilled in the art. Web services could include a combination of programming and data, which are available from a web server for web users, or the use of other web-connected programs as provided by an application service provider. Web services could use an extensible mark-up language (XML) as a standard for formatting data to be communicated.

Any type of arrangement can be used to access the intelligent server 11, including a peer-to-peer arrangement, a central server, or other architecture and communications. Also, middleware could be used. Data formats could be standardized and data exchanged using the extensive mark-up language (XML), which is the foundation for the web services description language (WSDL). Different web servers could be used, including the open source Apache or Microsoft's internet information server (IIS). Other web services could include Novel's web server for users of its netware operating system or the IBM family of Lotus domino service, for example, for IMB's OS/390 and AS/400 customers. Naturally, any web server should be able to download requests for file transfer protocol (FTP) files in a preferred embodiment.

The intelligent server 11 can have various import agents that are designed to retrieve configuration data from email clients 10a, 10b and 10c, including Eudora and Netscape besides the Outlook and Outlook Express email clients as illustrated. The intelligent server could include a Messaging Application Programming Interface (MAPI) to retrieve any configuration data for a MAPI-compliant email client. MAPI provides the application programming interface (API) to ensure system independence for messaging applications. A layer of functionality could be provided between applications at any underlying messaging systems and act as messaging middleware. MAPI-compliant applications could communicate through a MAPI subsystem to MAPI service providers that perform requested actions for clients and pass data back through a MAPI system to a MAPI client. Any mailbox configuration data 10d could reside in a configuration registry of the user system 10. Another example embodiments, data could reside in email client specific configuration storage.

In the user system, the Microsoft Outlook Express mail client 10b can access source mailboxes 12 that use the Post Office Protocol (POP) or Internet Mail Access Protocol (IMAP). POP, of course, is the internet mail server protocol that provides incoming message storage. The more recent protocol is POP3. POP is operative with a Simple Mail Transfer Protocol (SMTP). Any mail server could run both protocols if it is to receive, store and forward messages. The SMTP protocol exchanges messages from one mail server to another and hands messages to the required POP server for an email mailbox. A POP server can receive a message and hold it until another POP server is available. The IMAP version 4 also uses the SMTP transport mechanism, but it is a more flexible protocol because IMAP allows users to store mail on a mail server without downloading all new messages to a local machine. Internet mail service, of course, run SMTP and either POP or IMAP and receives incoming messages from any source without identity checking. Thus, mail can be selectively downloaded and read, message headers reviewed, hierarchical message stores built, address book supported, and documents linked, authenticated and searched.

The intelligent server 11 could generate configuration data objects and format data objects using an extensible mark-up language (XML) for submission to various XML-compliant web services. The server and web service could be a simple object access protocol (SOAP) compliant service.

XML, of course, as an extensive mark-up language, is a subset of the standard generalized mark-up language (SGML) would allow data to be stored and published on websites and be richer in presentation. Custom tags could be created to define the content of documents. Common information formats could be created and the format and data shared on the internet, corporate internets and/or other networks. The mark-up symbols in XML could be unlimited and self-defining. The channel definition format (CDF) could describe any channel and a specific CDF file can contain data that specifies an initial web page and how it can be updated.

SOAP allows one program running in one kind of operating system to communicate with the program in the same or another type of operating system by using HTTP and XML for information exchange. SOAP could specify how to encode an HTTP header in an XML file, thus, allowing one computer to call a program in another computer and pass data, while also dictating how it can return a response. SOAP is advantageous to allow data to pass through firewall servers that screen-out requests other than those for known applications to a designated port. SOAP is an XML-based protocol that has at least three parts, including: (a) an envelope to define a framework for describing what is in a message; (b) a set of encoding rules for expressing application-defined data types; and (c) a convention for representing remote procedure calls and responses.

The intelligent server 11 could include software that is implemented as an ActiveX control as a component object model (COM) and provide a framework for building software components that communicate with each other. ActiveX controls could be automatically downloaded and executed by a web browser. Distributed object applications could be built in active web pages and ActiveX controls could be downloaded to different browsers and clients. ActiveX controls could be held in a web browser as a container and distributed over an internet 12a or corporate intranet 12b. ActiveX controls could also manage and update web content and client systems and work closely with a user interface of a targeted operating system. Java applets or similar component objects could also be used instead of ActiveX controls. It should be understood for purposes of the present invention that an object model control could also be any type of dynamic link library (DLL) module that runs in a container as an application program using a component object model program interface.

In one aspect of the present invention, the less obvious conventions used by a mail domain are automatically learned and stored in a conventions store. Thus, the configuration parameters for subsequent users with mailboxes that belong to this mail domain can be determined based on the automatically learned conventions in the conventions store.

Figure 2:
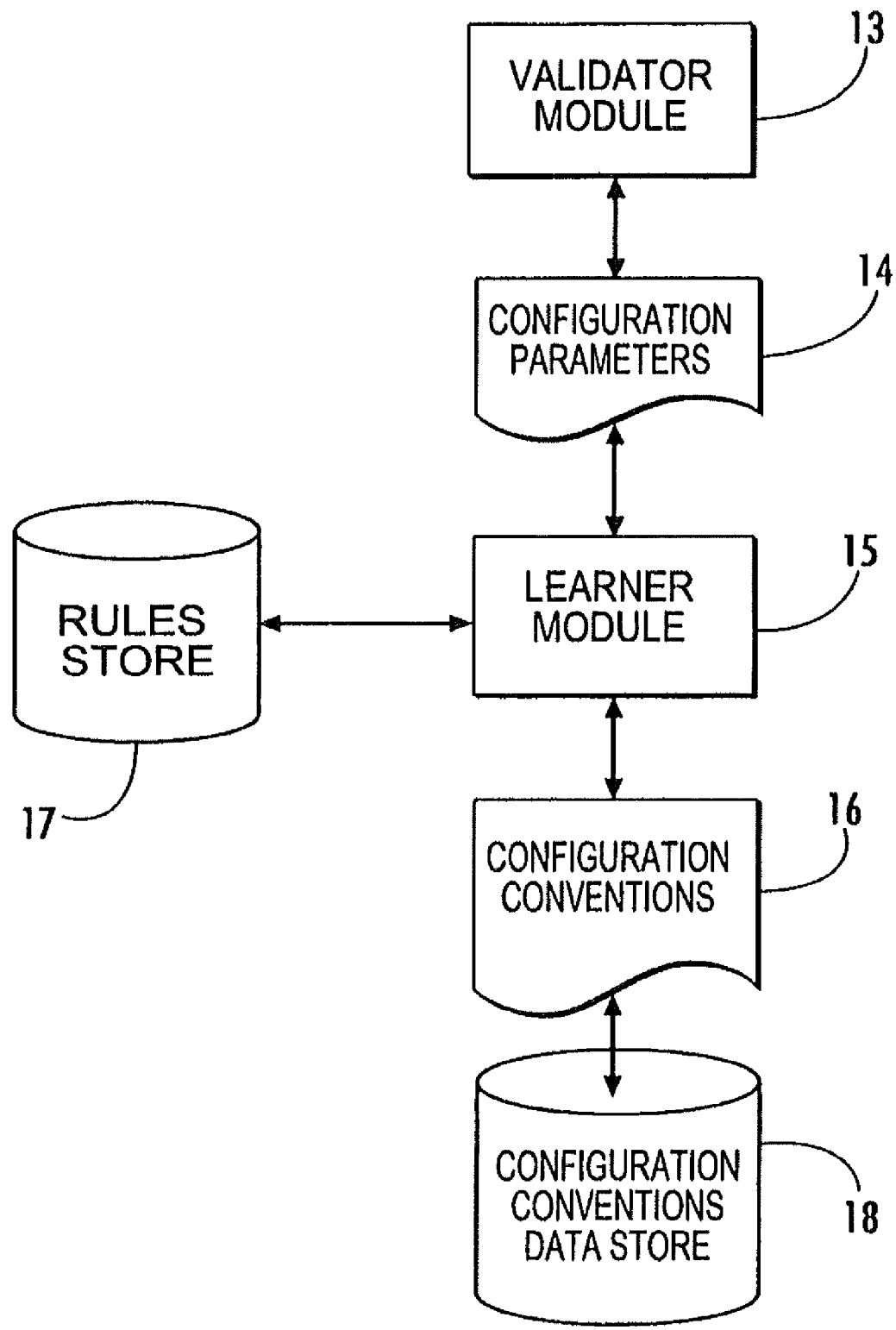
FIG. 2 is a block diagram of a system for automatically learning mailbox configuration conventions, according to one aspect of the invention.

FIG. 2 illustrates a system for automatically learning conventions used by mail domains according to one aspect of the present invention. The system is part of the intelligent server 11, which includes a validator module 13 that determines a valid set of configuration parameters 14. The server includes a learner module 15, which accepts the valid set of configuration parameters 14 and generates configuration conventions 16. A configuration conventions store 18 is operative as a database preferably part of the server, but could be separate. It stores the conventions for each mail domain. The learner module 15 is operative with a rules store 17 as a database of different rules.

The validator module 13 determines a valid set of configuration parameters 14 for a respective mailbox based on a limited number of configuration parameters provided by the user. In an example embodiment, the validator module 13 may try to access the respective mailbox using a set of best guesses (estimates) for the configuration parameters as provided by the service that invokes the validator module 13. In the example embodiment, if the access attempt fails, the validator module 13 may request additional information from the user until the validator module 13 has a valid set of configuration parameters. The validator module 13 accesses the mailbox being configured by using the access protocol relevant to the mailbox.

In an example embodiment, the validator module 13 would use POP to access a POP enabled mailbox to verify that the configuration parameters 14 are valid. In other example embodiments, the validator module 13 may use IMAP to access IMAP enabled mailboxes. As is obvious to those skilled in the art, there are many access protocols that may be used to access mailboxes. After attempting to validate the configuration parameters 14, the validator module 13 returns status information and the valid set of configuration parameters 14.

The learner module 15 accepts the configuration parameters 14 and generates the configuration convention 16 for the configuration parameters 14. The configuration convention 16 is a manner of formatting the conventions used for configuration parameters for storage in the configuration convention store 18. In an example embodiment, if the users email address is "john.smith@foo.com", and the login name parameter required by the relevant mail host is "jsmi", an expression within the configuration convention 16 for the login name parameter may be <FirstName(1)><LastName(3)>. As is obvious to one skilled in the art, a variety of formats could be used in implementing a configuration convention 16. The learner module 15 may apply certain tests to the configuration parameters 14 to ensure that the configuration parameters 14 are credible. In an example embodiment, the learner module 15 will only learn conventions in cases where the mail host is in the same mail domain as the email address of the user, to avoid attempts by "hackers" to pollute the learned configuration conventions 16. Other tests are envisioned to ensure the integrity of the learned configuration conventions 16. The learner module 15 may also apply rules that are stored in the rules store 17. These rules may be based on business criteria or other relevant criteria. In an example embodiment, the rules may indicate that certain conventions are not to be learned for security reasons.

Configuration conventions 16 that are deemed acceptable by the learner module 15 are then stored in the configuration conventions store 18. In an example embodiment, the configuration conventions store 18 may include standard configuration conventions applicable to all domains, as well as one or more of the automatically learned configuration conventions 16 for each mail domain. Mail domains may have more than one associated configuration convention, as there may be multiple ways and protocols in which the mailbox on the mail domain may be accessed.

Services may then access the configuration conventions 16 from the configuration convention store 18 to generate a list of potential sets of configuration parameters when configuring access to one or more of the user mailboxes.

Figure 3:
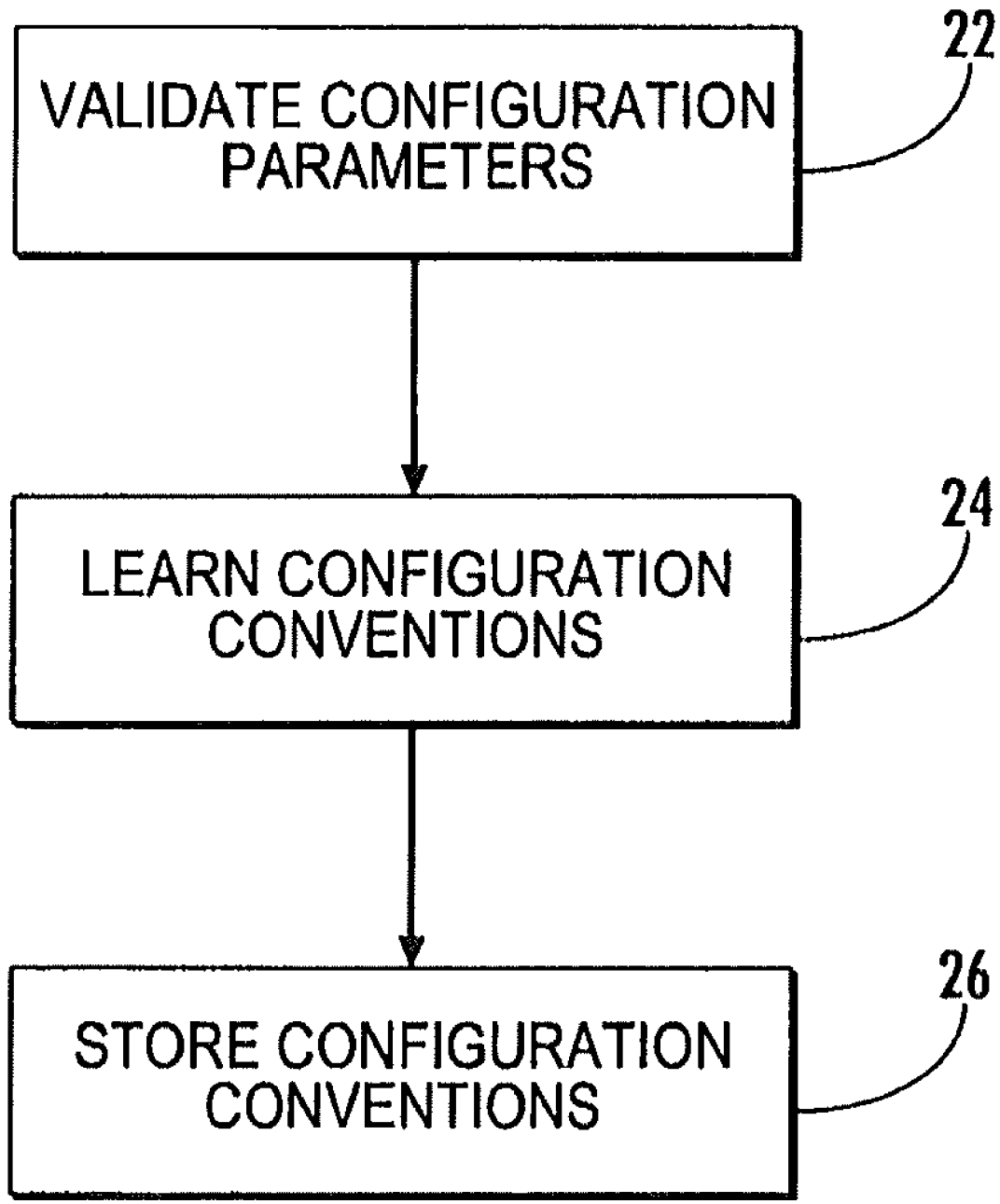
FIG. 3 is a flowchart illustrating an example of a method of automatically learning mailbox configuration conventions.

FIG. 3 is a flowchart illustrating one example of a method of learning the configuration conventions. In step 22, the validator module 13 attempts to determine the set of configuration parameters 14 that allow the validator module 13 to access the mailbox. The validator module 13 then returns the status of the validation attempt and the valid set of configuration parameters 14. In step 24, the learner module 15 generates configuration conventions 16 based on the configuration parameters 14. The learner module 15 may apply a set of tests to the configuration parameters 14 and may also apply a set of rules stored in the rules store 17, to the configuration parameters 14. In step 26, the configuration conventions 16 are stored in the configuration convention store 18.

It should be understood that the system and method for learning configuration parameters as described may be applied to configuration parameters for services other than mailbox access.

As noted before, based on empirical evidence, the vast majority of email providers adhere to a number of conventions when it comes to the configuration parameters used to access mailboxes. Almost all of the POP mail hosts in existence today are prefixed with "mail.", "pop.", or "pop3.". It is likely that a user with an email address of "john.smith@foo.com" would be able to access their POP-enabled mailbox through the host named "mail.foo.com", "pop.foo.com" or "pop3.foo.com". In one aspect of the present invention, these conventions are captured in a data store and it is possible for the service that requires access to the user's mailbox to use the conventions to generate potentially valid sets of configuration parameters. The server can then attempt to determine a valid set of configuration parameters that can be used to access the user's mailbox. The present invention can also determine the set of configuration parameters for the user's mailbox when the user only provides an email address and password. The system and method of the present invention can also successfully determine the configuration parameters in most cases. As new conventions are introduced or are discovered, they may be easily added to the data store.

Figure 4:
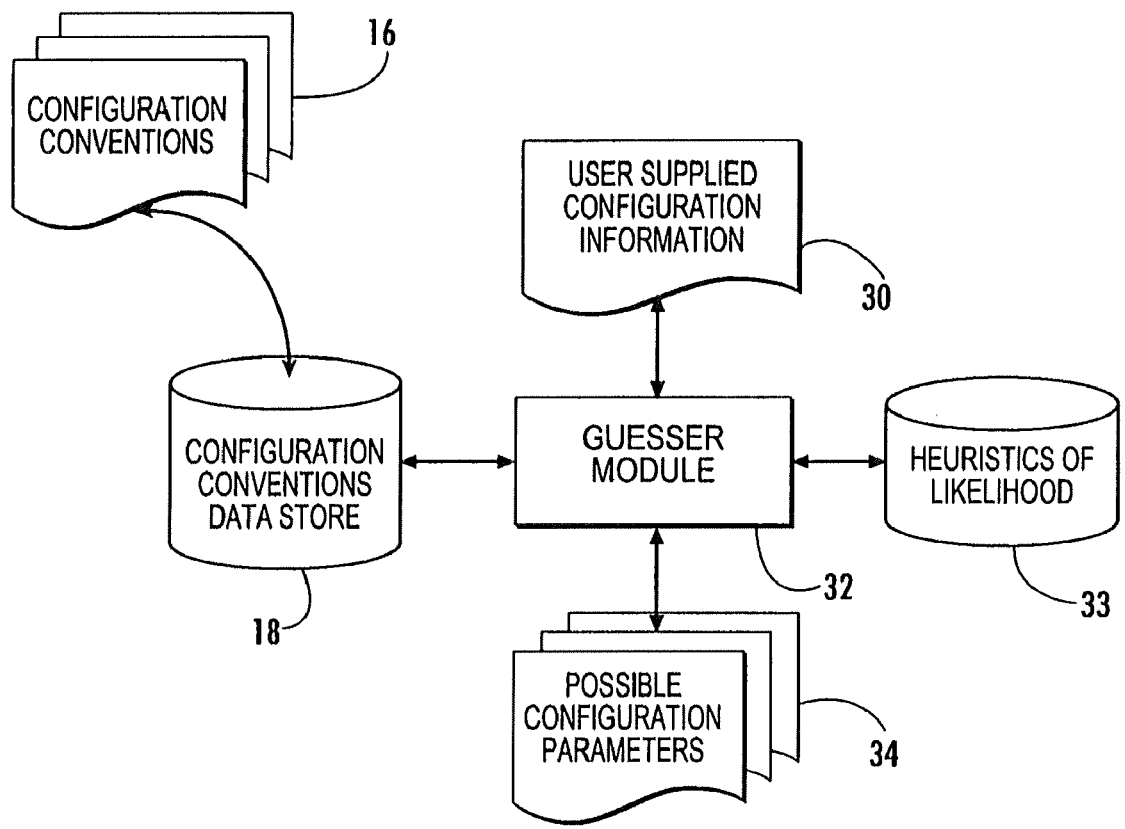
FIG. 4 is a block diagram of a system for determining configuration parameters, according to one aspect of the present invention.

In one aspect of the present invention shown in FIG. 4, a guesser or determination module 32 is part of the server 11 and operative as the mailbox interface module and generates possible sets of configuration parameters 34 based on user supplied configuration information 30, coupled with configuration conventions 16 stored in the configuration conventions data store 18. Services may then use the sets of configuration parameters 34 to determine the correct set of configuration parameters required to access the user's mailbox.

Figure 5:
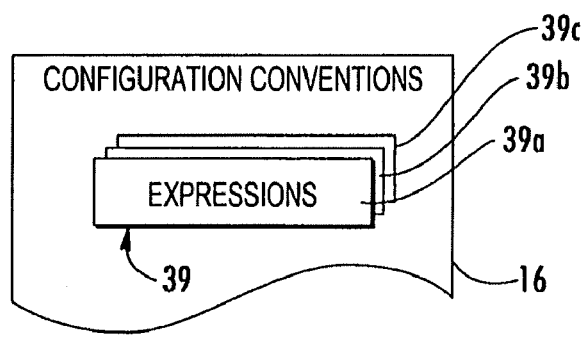
FIG. 5 is a block diagram showing details of configuration conventions using different expressions as a subset.

FIG. 5 shows further details of the configuration conventions 16. It should be understood that configuration conventions are sets of e-mail expressions formed by symbols, which can also be literals, such as a port number. In an example embodiment, a configuration convention 16 may comprise an expression for the server name parameter and an expression for the login name parameter. If, in the example embodiment, the email provider uses the login name "jsmith" and the mail domain "mail.foo.com" given an email address "john.smith@foo.com", the login name expression in the configuration convention 16 may be <FirstName(1)><LastName>, while the server name expression may be "mail.<MailDomain>". In this example, the number in brackets within the expression <FirstName(1)>, represents the number of characters to be used from the parameter <FirstName>, ie. "j". As is obvious to one skilled in the art, a variety of different symbolic representations may be used to represent the conventions for configuration parameters. The configuration conventions data store 18 stores the configuration conventions 16. As new conventions are introduced or discovered, they may be easily added to the configuration conventions store 18.

The module 32 generates the sets of possible configuration parameters 34 based on user-supplied information 30, and relevant configuration conventions 16 from the configuration conventions data store 18. In many cases, the users email address provides sufficient information to be able to generate an accurate set of configuration parameters. In the example embodiment, given the email address "jane.doe@foo.com", the module 32 would use the configuration conventions 16 to generate the possible configuration parameters 34 "jdoe" for the login name, and "mail.foo.com" for the server name.

Email providers use many conventions when determining configuration parameters, and as a result, the module 32 generates many sets of possible configuration parameters 34. To reduce the number of sets generated, the module 32 may only generate a subset of the sets of possible configuration parameters 34 based on additional user information, or based on heuristics of likelihood 33 that a given set of configuration parameters 34 may be successful under a given scenario. In an example embodiment, the user may indicate that only configuration conventions 16 with a protocol expression 39 of "IMAP" should be considered. In the example, the heuristics 33 could include tracking statistics about the number of attempts and percentage of successes using a given configuration convention 16, and thereby only generate possible configuration parameters 34 based on this configuration convention 16 if certain conditions are met.

Figure 6:
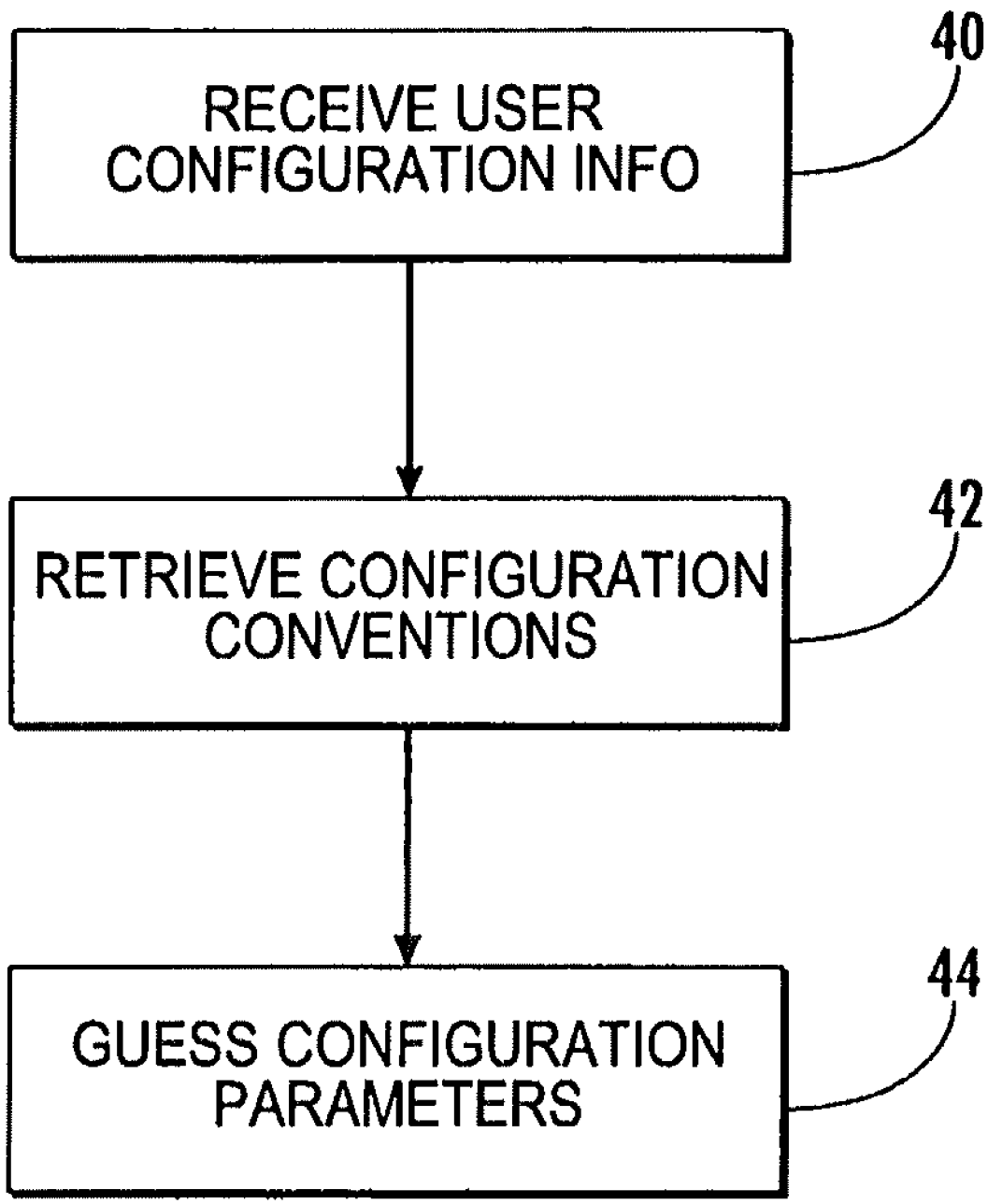
FIG. 6 is a flow chart illustrating an example of a method of determining the mailbox configurations.

FIG. 6 is a flowchart illustrating an example of a method of guessing possible configuration parameters 34 for configuring access to the users mailbox. In step 40, the module 32 receives user configuration information 30. In step 42, the module 32 retrieves relevant configuration conventions 16 from the configuration conventions data store 18. In step 44, the module 32 generates sets of possible configuration parameters 34 based on the configuration conventions 16 and the user supplied information 30. In this step 44, the module 32 would typically only generate a subset of the possible configuration parameters 34 by using either heuristics of likelihood 33 that a set of configuration parameters 34 would be valid, or by using additional user supplied information 30.

It should be understood that the system and method for guessing configuration parameters, according to one aspect of the present invention, may be applied to configuration parameters for services other than mailbox access.

Although many email providers adhere to fairly standard conventions for configuration parameters, such as naming the mail host "mail.<MailDomain>" and matching the login name to the email address, there are many other email providers that employ less obvious conventions, such as setting the login name to be <FirstName(1)><LastName(3)>, which in the case of the user with e-mail address of "john.smith@foo.com" would translate to the login name of "jsmi". In the case of protocols that use uniform resource locators (URL) to indicate the location of the mailbox, the conventions are even less standard, since the login names are often embedded in the middle of the URL.

By capturing these conventions in the data store, it is possible for the service that requires access to the user's mailbox to use the conventions to generate potentially valid sets of configuration parameters, and then attempt to determine a valid set of configuration parameters that can be used to access the user's mailbox. Therefore, it is possible to determine the set of configuration parameters for the user's mailbox even if the user is unable to provide all of the necessary configuration information. All that may be required from the user is an email address and password, from which the system may be able to successfully determine the configuration parameters in most cases. As new conventions are introduced or are discovered, they may be easily added to the data store.

In one aspect of the present invention, the configuration parameters are represented using symbolic expressions, which may then be retained in the configuration conventions data store 18 for use by the service. This allows the service to draw configuration conventions from the data store, and using context data, to construct a valid set of configuration parameters that can be used to access mailboxes.

Figure 7:
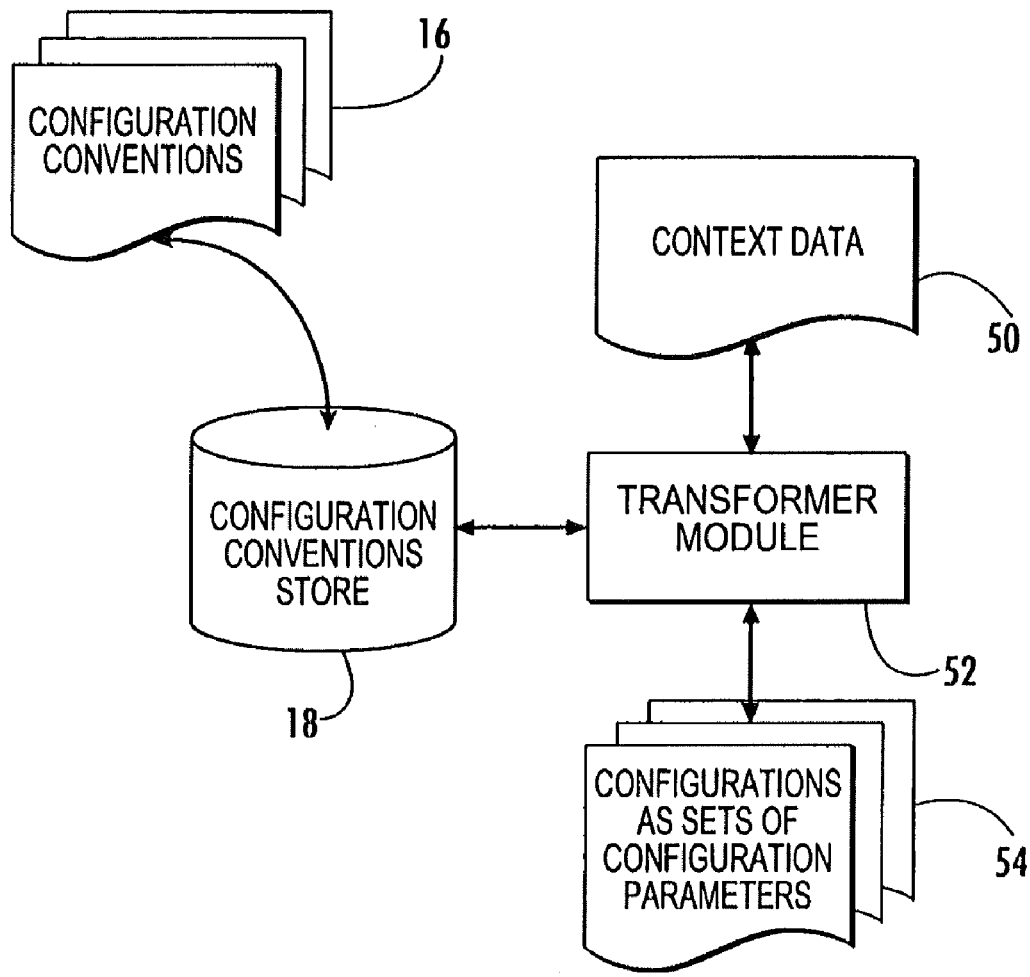
FIG. 7 is a block diagram illustrating a system for using symbolic expressions to represent conventions used for mailbox configuration parameters, according to one aspect of the present invention.

FIG. 7 illustrates an example of a system of the present invention for generating configurations that comprise sets of configuration parameters 54. A transformer module 52 as part of server 11 takes configuration conventions 16 stored in a configuration conventions data store 18 and expands them to generate configuration parameters 54 based on user supplied context data 50.

Figure 8:
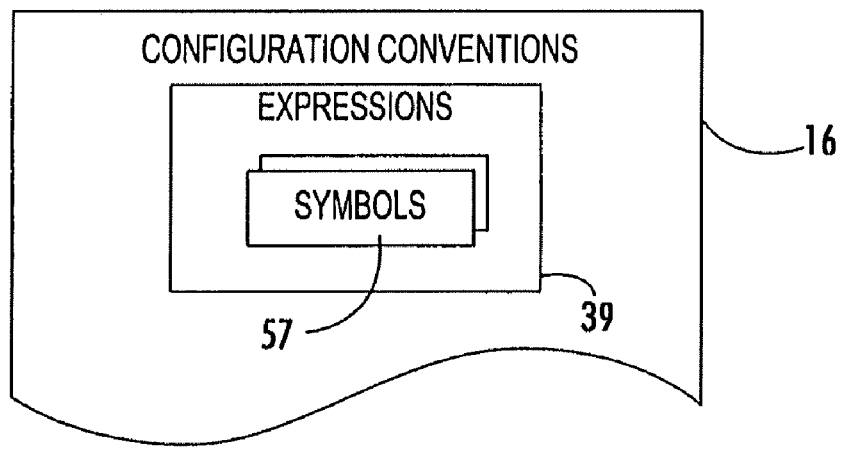
FIG. 8 is a block diagram showing an example of a representation for configuration conventions that are sets of e-mail expressions formed by symbols.

FIG. 8 shows further details of the symbolic representation of configuration conventions 16. The configuration conventions 16 symbolically represent the conventions used by email providers for a set of configuration parameters. The configuration conventions 16 comprise expressions 39 that represent individual configuration parameters using symbols 57. In an example embodiment, the configuration convention 16 may be formed as an expression for the server name parameter, an expression for the login name parameter, and an expression for the mail protocol. If, in the example embodiment, the email provider uses the login name "jsmi" and the mail domain "mail.foo.com" given an email address "john.smith@foo.com", the login name expression in the configuration convention 16 may be "<FirstName(1)><LastName(3)>", while the server name expression may be "mail.<MailDomain>". In this example, the number in brackets within the symbol 57 "<FirstName(1)>", represents the number of characters to be used from the users first name parameter, i.e., "j". Similarly, the number in brackets in a symbol 57 "<LastName(3)>" represents the number of characters to be used from the users last name, ie. "smi". As is obvious to one skilled in the art, a variety of different symbolic representations may be used to represent the conventions for configuration parameters. The choice of expressions 39 can be quite arbitrary, and are only limited by the requirement that the expression 39 can be expanded into a configuration parameter based on the context data 50 supplied to the transformer module 52.

The configuration conventions data store 18 stores the configuration conventions 16. As new conventions are introduced or discovered, they may be easily added to the configuration conventions data store 18.

The transformer module 52 expands the individual expressions 39 into configuration parameters by expanding each symbol 57 into its corresponding value using context data 50. In an example embodiment, a configuration convention 16 may comprise the mail protocol expression 39a, "POP", the server name expression 39b "mail.<MailDomain>" and the login name expression 39c "<FirstName(1)><LastName(3)>", for example, as shown in FIG. 5 for a plurality of expressions. If the transformer module 52 were provided with the context data 50 comprising the email address "john.smith@foo.com", the transformer module 52 would infer the mail domain as "foo.com" from the email address. It would then generate the configuration parameters 34 of "POP" for the mail protocol, "mail.foo.com" for the server name, and "jsmi" for the login name.

Figure 9:
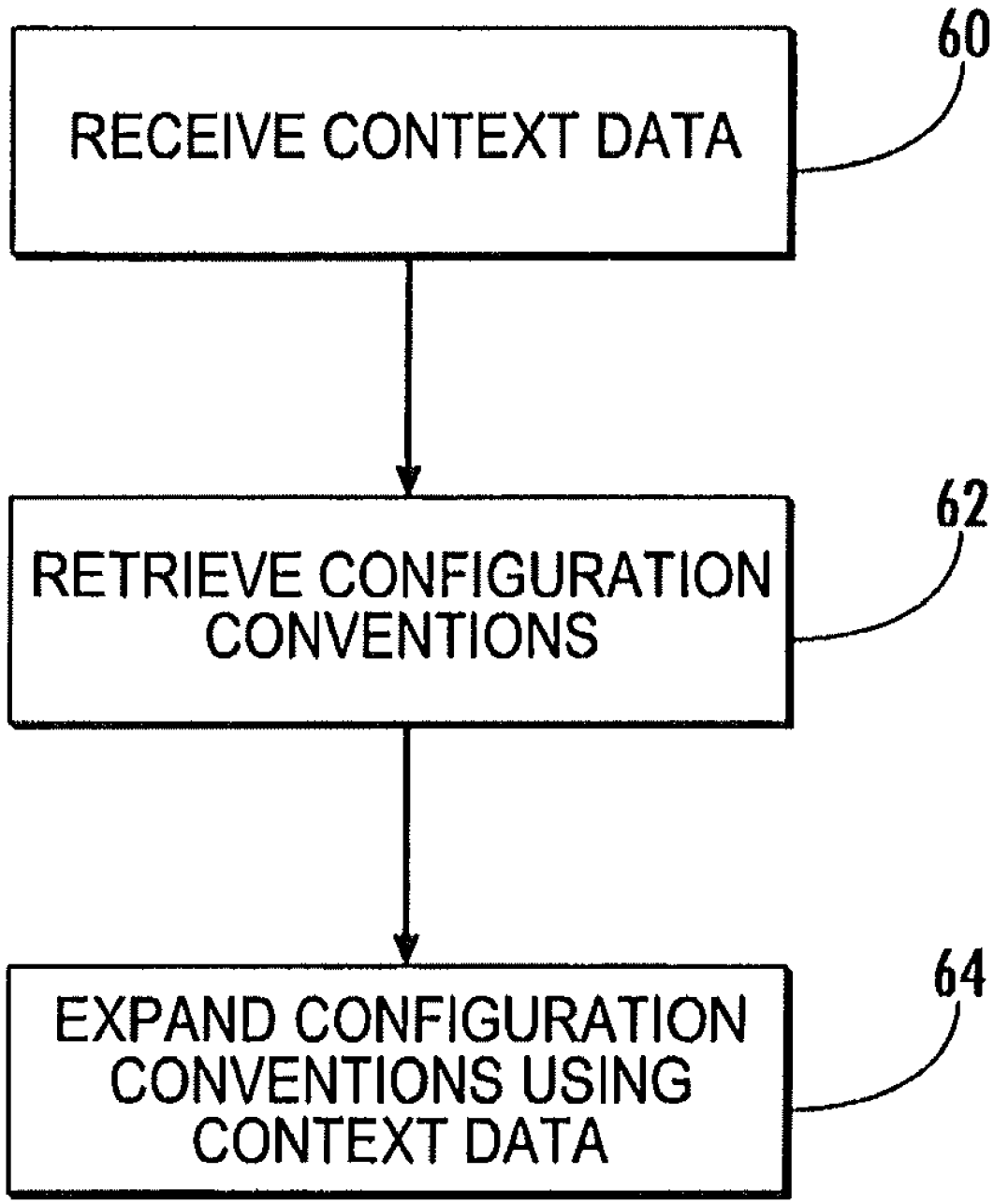
FIG. 9 is a flow chart illustrating an example of a method of generating configurations by expanding configuration conventions using context data.

FIG. 9 is an example of a flowchart illustrating a method of generating configurations by expanding expressions 39 using context data 50. In step 60, the transformer module 52 receives context data 50. In step 62, the transformer module 52 infers the mail domain for the users mailbox, and retrieves the relevant configuration conventions 16. In step 64, the transformer module 52 expands the symbols 57 within the expressions 39 of the configuration convention 15 using the context data 50, to generate configurations that are formed by sets of configuration parameters 54.

An exemplary hand-held mobile wireless communications device 1000 that can be used in the present invention is further described in the example below with reference to FIG. 10. The device 1000 includes a housing 1200, a keyboard 1400 and an output device 1600. The output device shown is a display 1600, which is preferably a full graphic LCD. Other types of output devices may alternatively be utilized. A processing device 1800 is contained within the housing 1200 and is coupled between the keyboard 1400 and the display 1600. The processing device 1800 controls the operation of the display 1600, as well as the overall operation of the mobile device 1000, in response to actuation of keys on the keyboard 1400 by the user.

The housing 1200 may be elongated vertically, or may take on other sizes and shapes (including clamshell housing structures). The keyboard may include a mode selection key, or other hardware or software for switching between text entry and telephony entry.

Figure 10:
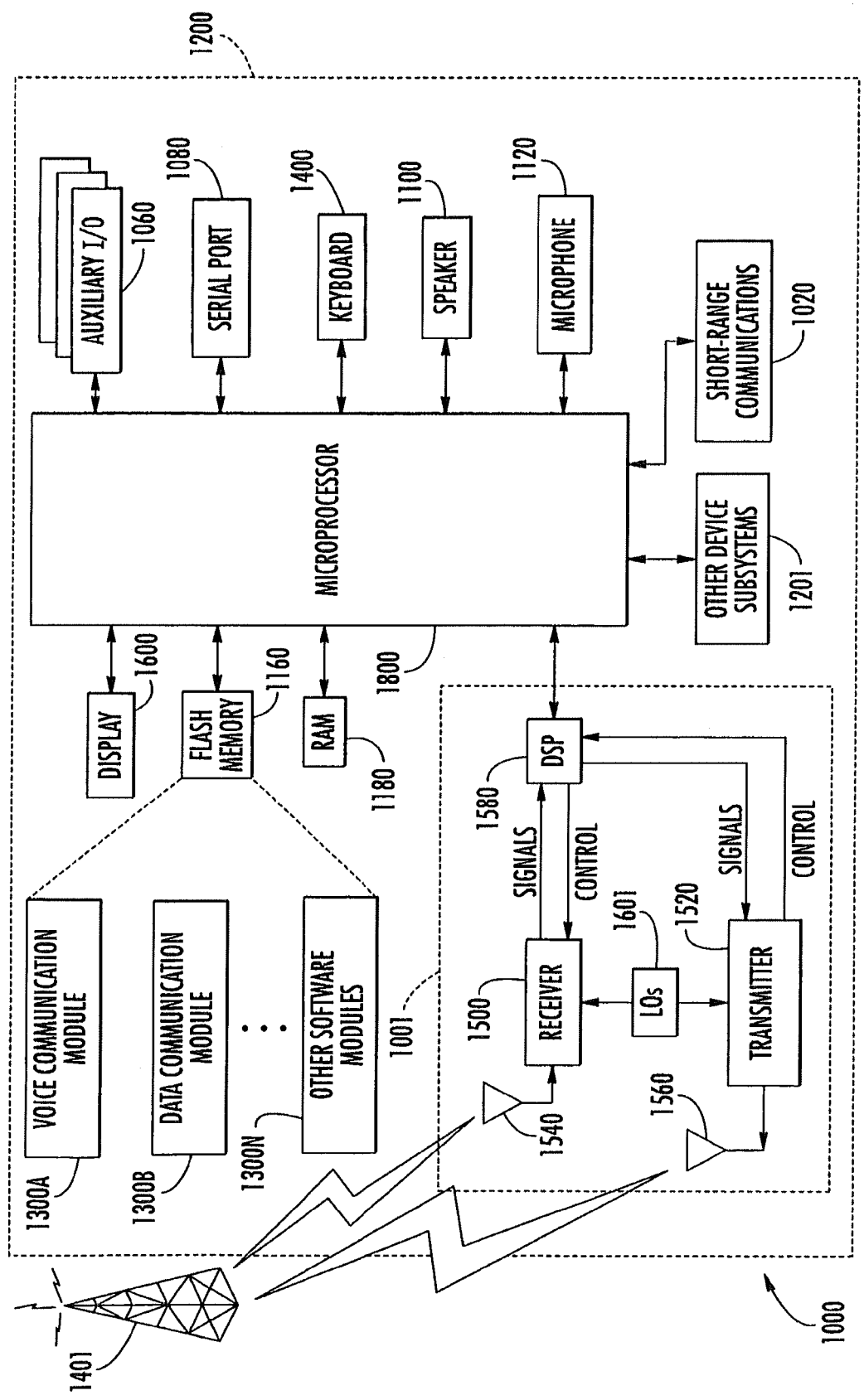
FIG. 10 is a schematic block diagram illustrating an exemplary mobile wireless communications device for use in the present invention.

In addition to the processing device 1800, other parts of the mobile device 1000 are shown schematically in FIG. 10. These include a communications subsystem 1001; a short-range communications subsystem 1020; the keyboard 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system. Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 1000.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keyboard 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

It will be appreciated that the above description relates to preferred embodiments by way of example only. Many variations on the systems and methods described above will be obvious to those knowledgeable in the field, and such obvious variations are within the scope of the invention as described, whether or not expressly described.

For example, the system and method for learning and guessing configuration parameters may be applied to configuration parameters for services other than mailbox access. Symbolic expressions could be used to represent conventions for configuration parameters for services other than email and mailbox access.

This application is related to copending patent applications entitled, "SYSTEM AND METHOD FOR CONFIGURING ACCESS TO ELECTRONIC MAILBOXES," and "SYSTEM AND METHOD FOR GENERATING CONFIGURATIONS USED FOR ACCESSING ELECTRONIC MAILBOXES," which are filed on the same date and by the same assignee and inventors, the disclosures which are hereby incorporated by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communication system comprising:
a user device; and
en email interface configured to be operative between the user device and an email box of the user, the email interface comprising
a validator module configured to determine a set of valid configuration parameters to access the email box based upon configuration information from the user that is limited in configuration parameters,
the validator module also configured to request additional information from the user and determine at least one subsequent set of potentially valid configuration parameters for reattempting access if an initial set of potentially valid configuration parameters fails,
a learner module configured to generate configuration conventions based upon the set of valid configuration parameters, and
a database configured to store the configuration conventions.

2. The system according to claim 1 wherein the validator module and learner module are operative as a component object model acting as an agent between the user device and the email box.

3. The system according to claim 1 wherein the user device comprises a mobile device.

4. The system according to claim 1 further comprising a web server on which the validator module and learner module are operative.

5. The system according to claim 4 wherein the database is stored on the web server.

6. The system according to claim 1 wherein the learner module is operative for applying tests to the configuration parameters to ensure that the configuration parameters are credible.

7. The system according to claim 1 wherein the learner module is operative for applying rules from a rules database for indicating which configuration conventions are to be learned.

8. The system according to claim 1 wherein the configuration conventions stored within the database comprise configuration conventions applicable to a plurality of mail domains.

9. The system according to claim 1 wherein the configuration information comprises an email address and a password.

10. The system according to claim 1 wherein the configuration information comprises an access protocol for the email box being accessed.

11. The system according to claim 10 wherein the access protocol comprises a Post Office Protocol (POP) or an Internet Message Access Protocol (IMAP).

12. A communication device comprising:
an email interface configured to be operative between a user device and an email box of the user, the email interface comprising
a validator module configured to determine a set of valid configuration parameters to access the email box based upon configuration information from the user that is limited in configuration parameters,
the validator module also configured to request additional information from the user and determine at least one subsequent set of potentially valid configuration parameters for reattempting access if an initial set of potentially valid configuration parameters fails,
a learner module configured to generate configuration conventions based upon the set of valid configuration parameters, and
a database configured to store the configuration conventions.

13. The communication device according to claim 12 wherein the validator module and learner module are operative as a component object model acting as an agent between the user device and the email box.

14. The communication device according to claim 12 wherein the learner module is operative for applying tests to the configuration parameters to ensure that the configuration parameters are credible.

15. The communication device according to claim 12 wherein the learner module is operative for applying rules from a rules database for indicating which configuration conventions are to be learned.

16. The communication device according to claim 12 wherein the configuration conventions stored within the database comprise configuration conventions applicable to a plurality of mail domains.

17. The communication device according to claim 12 wherein the configuration information comprises an email address and a password.

18. The communication device according to claim 12 wherein the configuration information comprises an access protocol for the email box being accessed.

19. A method for making an email interface to be operative between a user device and an email box of the user, the method comprising:
    configuring a validator module to
        determine a set of valid configuration parameters to access the email box based upon configuration information from the user that is limited in configuration parameters, and
        request additional information from the user and determine at least one subsequent set of potentially valid configuration parameters for reattempting access if an initial set of potentially valid configuration parameters fails;
    configuring a learner module to generate configuration conventions based upon the set of valid configuration parameters; and
    storing the configuration conventions in a database.

20. The method according to claim 19 wherein the validator module and learner module are operative as a component object model acting as an agent between the user device and the email box.

21. The method according to claim 19 wherein the user device comprises a mobile device.

22. The system according to claim 19 further comprising a web server on which the validator module and learner module are operative.

23. The method according to claim 22 wherein the database is stored on the web server.

24. The method according to claim 19 wherein the learner module is operative for applying tests to the configuration parameters to ensure that the configuration parameters are credible.

25. The method according to claim 19 wherein the learner module is operative for applying rules from a rules database for indicating which configuration conventions are to be learned.

26. The method according to claim 19 wherein the configuration conventions stored within the database comprise configuration conventions applicable to a plurality of mail domains.

27. The method according to claim 19 wherein the configuration information comprises an email address and a password.

28. The method according to claim 19 wherein the configuration information comprises an access protocol for the email box being accessed.

29. A non-transitory computer-readable medium operative as an email interface between a user device and an email box of the user comprising:
    a validator module configured to determine A set of valid configuration parameters to access the email box based upon configuration information from the user that is limited in configuration parameters;
    the validator module also configured to request additional information from the user and determine at least one subsequent set of potentially valid configuration parameters for reattempting access if an initial set of potentially valid configuration parameters fails; and
    a learner module configured to generate configuration conventions based upon the set of valid configuration parameters.

30. The non-transitory computer-readable medium according to claim 29 wherein the learner module is operative for applying tests to the configuration parameters to ensure that the configuration parameters are credible.

31. The non-transitory computer-readable medium according to claim 29 wherein the learner module is operative for applying rules from A rules database for indicating which configuration conventions are to be learned.

\* \* \* \* \*